US008108903B2

(12) United States Patent
Norefors et al.

(10) Patent No.: US 8,108,903 B2
(45) Date of Patent: Jan. 31, 2012

(54) ARRANGEMENT AND A METHOD RELATING TO IP NETWORK ACCESS

(75) Inventors: Arne Norefors, Stockholm (SE); Ulf Schuberth, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1147 days.

(21) Appl. No.: 11/298,568

(22) Filed: Dec. 12, 2005

(65) Prior Publication Data

US 2006/0094403 A1    May 4, 2006

Related U.S. Application Data

(63) Continuation of application No. PCT/SE2003/001053, filed on Jun. 18, 2003.

(51) Int. Cl.
*G06F 7/04* (2006.01)
(52) U.S. Cl. .................. 726/2; 726/8; 713/168; 455/410
(58) Field of Classification Search .......... 713/150–155, 713/159, 168–170, 172, 182–185; 726/2–14, 726/16–21; 380/247–248, 255–257, 270; 455/403, 410–411; 709/223–225
See application file for complete search history.

(56) References Cited

U.S. PATENT DOCUMENTS

| | | | |
|---|---|---|---|
| 6,609,198 B1 * | 8/2003 | Wood et al. .................. 713/155 |
| 6,715,082 B1 * | 3/2004 | Chang et al. ..................... 726/8 |
| 2002/0095507 A1 * | 7/2002 | Jerdonek ...................... 709/229 |
| 2003/0051041 A1 * | 3/2003 | Kalavade et al. ............. 709/229 |
| 2003/0204725 A1 * | 10/2003 | Itoi et al. ....................... 713/168 |
| 2003/0204726 A1 | 10/2003 | Kefford et al. |
| 2003/0208695 A1 * | 11/2003 | Soto et al. ...................... 713/202 |
| 2004/0250118 A1 * | 12/2004 | Andreev et al. ............... 713/201 |
| 2005/0081045 A1 * | 4/2005 | Nicodemus et al. .......... 713/182 |
| 2005/0114680 A1 * | 5/2005 | Chinnaswamy et al. ..... 713/185 |
| 2005/0154895 A1 * | 7/2005 | Zhang ............................ 713/182 |
| 2007/0118769 A1 * | 5/2007 | England et al. ............... 713/193 |

FOREIGN PATENT DOCUMENTS

| | | |
|---|---|---|
| GB | 2 379 040 | 2/2003 |
| WO | 02/084456 | 10/2002 |
| WO | 03/015370 | 2/2003 |

OTHER PUBLICATIONS

International Search Report for PCT/SE2003/001053 dated Jan. 22, 2004.

* cited by examiner

*Primary Examiner* — Kim Vu
*Assistant Examiner* — Darren B Schwartz
(74) *Attorney, Agent, or Firm* — Nixon & Vanderhye P.C.

(57) ABSTRACT

The present invention relates to an arrangement and a method respectively for providing an end user with access to an IP network (login). It comprises a user station, an access server of an access network, a web server and an authentication server. The end user station comprises first means for communication with the access server and second means for communication over a mobile telecommunication system with the authentication server. The access/login procedure comprises a first and a second phase, the authentication server controls the first phase comprising a one-time-password (OTP) login sequence, and, if the one time password (OTP) is valid, the second login phase is performed in order to login the end user at the access server, by creating a temporary account for which user credentials are defined.

47 Claims, 3 Drawing Sheets

ARRANGEMENT AND A METHOD RELATING TO IP NETWORK ACCESS

This is a continuation application of PCT/SE2003/001053, filed 18 Jun. 2003, which designated the U.S., the entire contents of which are hereby incorporated by reference.

FIELD OF THE INVENTION

An aspect of the present invention relates to an arrangement and a method for providing an end user with access to an IP network, i.e. here for end user login. Another aspect relates to an access server of an access network over which access is provided, i.e. over which the end user can log in at the IP network.

STATE OF THE ART

To get access to some kind of a service in general, entering of password and username is needed. However, in the society of today the number of passwords etc. that one single user needs to remember, keep stored safely etc. is high, and might increase still further. There might e.g. be a particular password for WLAN access, for Internet services etc.

WISPs (Wireless Internet Service Providers) offer IP network access based on a web dialogue with the user for login and Radius communication with a Radius server. The typical procedure is to use a username and a static password. There are described preferred practises for how this could be done e.g. from Wi-Fi Alliance industry forum in the WISPr best practice document. The involved protocols are HTTP and Radius as defined by IETF (www.ietf.org). However, a static username is normally used at login. A static user name can easily be copied and hence be used by several persons. One attempt to solve this problem consists in using a one-time password (OTP), which only can be used during a limited time period, thereafter it is blocked. To get access or login to Internet at e.g. public places, such as airports, railway stations, hotels etc. generally a WLAN may be used as access network. Generally the coverage is not so large and depends on construction etc. of the building, and moreover there are not so many frequencies available. The building and integration of radio networks is complicated and expensive. Access issues are thus complicated for several reasons, both for operators, users and network owners.

SUMMARY OF THE INVENTION

What is needed is therefore an arrangement through which access to an IP network, login, can be provided in an easy manner, both from the point of view of the end user and from the point of view of the operator. An arrangement is also needed through which login can be provided with a minimum risk of abuse, e.g. through copying of usernames, finding usernames written down somewhere or similar. Further yet an arrangement is needed through which access/login can be provided without substantial impact on access servers, and through which existing access servers can be used without requiring access server upgrading. This is an important aspect since the organisation running the access server can be different from the operator that controls the web and authentication nodes, and has the commercial relation with the user. Reuse of existing access network is especially advantageous when a radio based access is used as an additional radio network might cause interference with the already installed one. Still further a method is needed through which one or more of the above mentioned objects can be achieved. Further yet an access server is needed through which one or more of the objects referred to can be achieved, and which can be used to provide login.

An arrangement is also needed through which a uniform login interface is achieved, even if the end user is served by different WISP:s, independent of each other.

Therefore an arrangement is provided which comprises a user station, an access network access server, a web server and an authentication server. Thus, the user station may here be seen as comprising two means, a first means, e.g. a PC, and a second means, e.g. a mobile telephone, the main thing however being that a one-time-password or similar that is used during the first phase is provided or transferred to the user over a mobile telecommunications network and that the login procedure is performed in two steps, or phases. A method for providing end users with access (logging in) to an IP network is also provided.

Therefore also an access server for an access network is provided which communicates with an end user station for providing said end user station with access to an IP network, and with a web server and an authentication server.

According to an aspect of the invention is thus an arrangement, for providing an end user station, an access server of an access network, a web server and an authentication server suggested. It comprises an end user station with first means for communication with an access server, second means for communication with an authentication server over a mobile telecommunications system and the access/login procedure comprises a first and a second phase. The authentication server controls the first phase, said first phase comprising a one-time password (OTP) login sequence, and the second login phase is performed by creating/modifying a temporary account for which user credentials are defined in order to log in the end user at the access server. Particularly the second login phase only is performed if the OTP is valid. For the second phase a user account is created/modified in the authentication server, which particularly is temporary, i.e. that it allows login only for a limited time period. The access server (AS) is particularly operated by an Internet Service Provider or a WISP. The one-time-password (OTP) used in the first phase is in one implementation reused in the second phase. Particularly the one-time-password (OTP) is created by, and transferred from, the authentication server to the second means of the end user station over the mobile telecommunication system. The first means of the user station may comprise a PC, and the second means may comprise a mobile telephone. Other alternatives are also possible.

The OTP is most particularly transferred by an alfa numeric text message, e.g. a SMS or a voice message to the second means (e.g. mobile telephone) of the user station. When transferred to the user station (mobile telephone), the OTP is to be entered on the first means of the user station (PC) and provided to the authentication server for authentication/validation. If the OTP is valid, the OTP from the first phase may be reused in the second phase. If the OTP is valid, a user name and a password of the created/modified account are particularly defined, which are uniquely tied to the OTP sequence. The second phase can be performed on different ways, and user name and password can be used in different ways.

In one embodiment, in the second phase, the same user name is used as in the first phase and the OTP is used as password. In another embodiment a dynamic user name is used and the OTP (of the first phase) is used as password. Still further a static user name (common for all users) may be used and the OTP (of the first phase) may be used as password. In still another embodiment a static user name (common for all users) is used and a random number is used as password. Still further a dynamic user name may be used and a random value can be used as password. Other alternatives are also possible.

Advantageously the web server redirects the login message to the access server login page when an account has been created/modified in the authentication server and a timer is set to a given time period during which user credentials are checked, and if they are not valid, an error message is returned to the user. Particularly, if the user credentials comprise user name and password, and if they are verified/authenticated within the given time period, the user is given access and the added/modified temporary user account is removed/disabled. In one implementation the authentication server comprises a Radius server, in another a Diameter server. However, any appropriate authentication server can be used. In some embodiments one or more proxy servers are provided between the access server (AS) and the authentication (Radius, Diameter etc.) server. The access network particularly comprises a WLAN, an Ethernet or similar.

Advantageously login syntax is stored in the access server, and the login syntax is transferred to the web server to subsequently form part of a redirect message. Alternatively login syntax is stored with the operator, which however is more difficult to administrate since the operator needs detailed knowledge about the different access servers of the (W)ISP:s. (For an operator normally access servers of several manufacturers are to be used.)

Another aspect of the invention is directed to an access server in an access network communicating with an end user station, for providing said end user station with an end user station, for providing said end user station with access to an IP network, with a web server and with an authentication server. The access server allows any user to perform an access attempt to the web server, e.g. by using a white list function, a login link to the operator, and supports authentication server roaming. The access server supports a second phase of a login procedure following on a first phase during which a one-time-password is given. For said second phase a temporary user account is created/modified, the password and user name of which are defined and uniquely associated with the one-time-password given by the authentication server and provided to the user station over a mobile communication system e.g. as an SMS, voice message or similar in the first phase. It may e.g. be an access server of a WLAN, an Ethernet or similar, run by i.e., operated by, an Internet Service Provider, e.g. a wireless ISP.

A further aspect of the invention is directed to a method for providing an end user with access to an IP network over an access network comprising an access server. For the login procedure, the method comprises the steps of:
performing a first phase of a login procedure whereby a one-time-password (OTP) is provided by an authentication server and transferred to the end user over a mobile communication system, e.g. by a SMS or voice message,
checking the validity/authenticity of the one-time-password, (and if valid),
adding/modifying a temporary account in the authentication server, for a second phase of the login procedure,
defining a user name and a password uniquely tied to the one-time-password of the first phase,
checking the validity of the user name and the password in the authentication server, and if valid,
allowing the user login request,
removing/disabling the temporary user account after lapse of a predetermined time period.
Particularly the steps of performing the first phase of the login comprises the steps of:

sending a login request to an access server from the user station,
receiving a response from the access server if the user station enabling activation of a link to the operator web (login) server,
accessing the web server,
entering end user station identity in web server,
providing a one-time-password (OTP) to the user station from the authentication server and transferring it to the user station over the mobile communications system, e.g. by SMS or a voice message;
requesting the one-time-password by web server,
verifying validity/authenticity of the one-time-password, whereas the second phase advantageously comprises the steps of:
redirecting the login request to the login page of the access server;
setting a timer,
checking the validity/authenticity of the user credentials, e.g. password, user name, in authentication server, and if valid,
removing/disabling the temporary account at expiry of the set timer.

Particularly the same user name may be used in the second phase as in the first phase, and the OTP may be used as password. In one embodiment the method comprises the steps of; in the second phase:
using a dynamic user name,
using the OTP of the first phase as password.
Alternatively it comprises the steps of:
using a static user name common for all users,
using the OTP of the first phase or random number as password.
Further still it may comprise the steps of, in the second step:
using a dynamic user name,
using a random value as password.

BRIEF DESCRIPTION OF THE DRAWINGS

The invention will in the following be further described, in a non-limiting manner, and with reference to the accompanying drawings, in which.

DETAILED DESCRIPTION OF THE INVENTION

Figure 1:
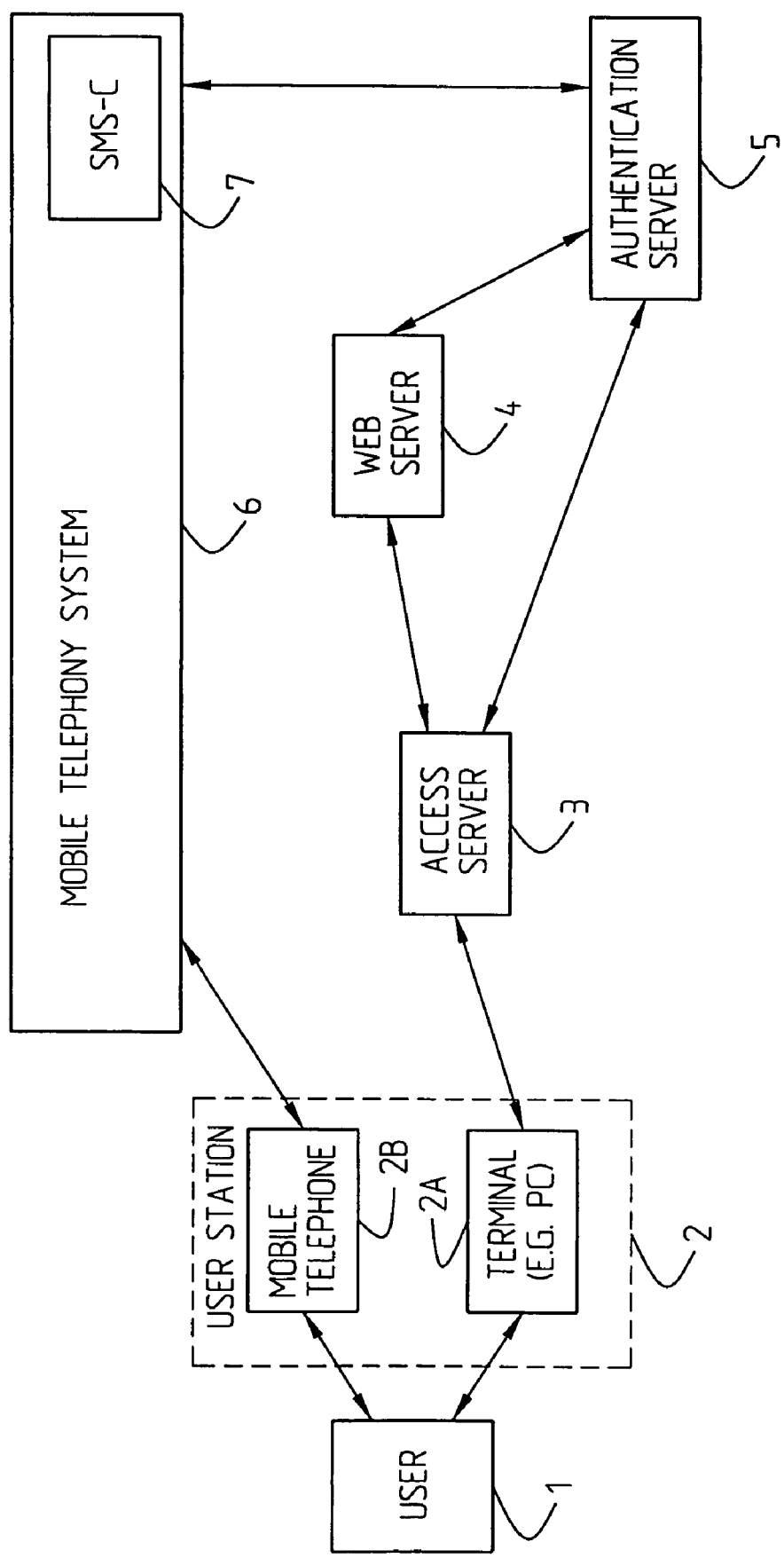
FIG. 1 is a very schematical block diagram illustrating an arrangement according to the invention.

FIG. 1 shows a user 1 with a user station 2 comprising a first means, a terminal, e.g. PC 2A and a second means, a mobile telephone 2B. The terminal 2A communicates with access server AS 3 which is operated by an ISP (Internet Service Provider) or a WISP (Wireless ISP). The access server 3 is an AS of an access network, e.g. a WLAN (Wireless Local Access Network) or an Ethernet, communicating with a web server 4 and an authentication server 5. Through the implementation of the inventive concept substantially any access server can be used in principle without modification, it only needs some reconfiguration. Only limited, slight requirements are put on the access server, such as addition of a login link to the operator, support of authentication server roaming and the provisioning of a white list or similar, i.e. the user can reach the web server prior to successful authentication. The authentication server 5 may e.g. be a Radius (Remote Access Dial-in server) server or a Diameter server or similar. Radius is described in Radius, IEEE RFC (Request for Comments) 2865 which herewith is incorporated herein by reference. There may also be more than one authenticationserver. For example there can be two authentication servers, each supporting one phase in the login procedure.

The mobile telecommunications system 6 with SMS-C (Short Message Service Center) 7 is here used to provide the user with an OTP as will be further described below.

To initiate the procedure the terminal, e.g. a PC 2A establishes communication with the access server 3 run by an (W)ISP, which enables user contact with the web server 4, through which an OTP can be requested from authentication server 5. Authentication server then provides an OTP and transfers it to the user station (second means, mobile telephone 2B) over mobile telephony system 6 by means of SMS-C7. The login procedure is handled in a first and a second phase, of which the first is an OTP sequence controlled by the authentication server 5. If this first phase is successful, i.e. when an OTP is delivered and verified, the second login phase follows that logs in the user at the access server 3. The OTP obtained and used in the first phase may be reused in the second phase. Other alternatives are however also possible as will be further described below.

Using inventive aspects of the invention operators owning networks and having a large amount of customers are enabled to offer branded services based on OTP to their customers based on partnership agreements with access network providers having access servers, without there being any considerable requirements on the access servers. Login to different types/brands of access servers can easily be managed since the login syntax is handled by a (W)ISP. In one aspect, a temporary account allowing access during a limited time period is provided and used during the second login phase.

Figure 2:
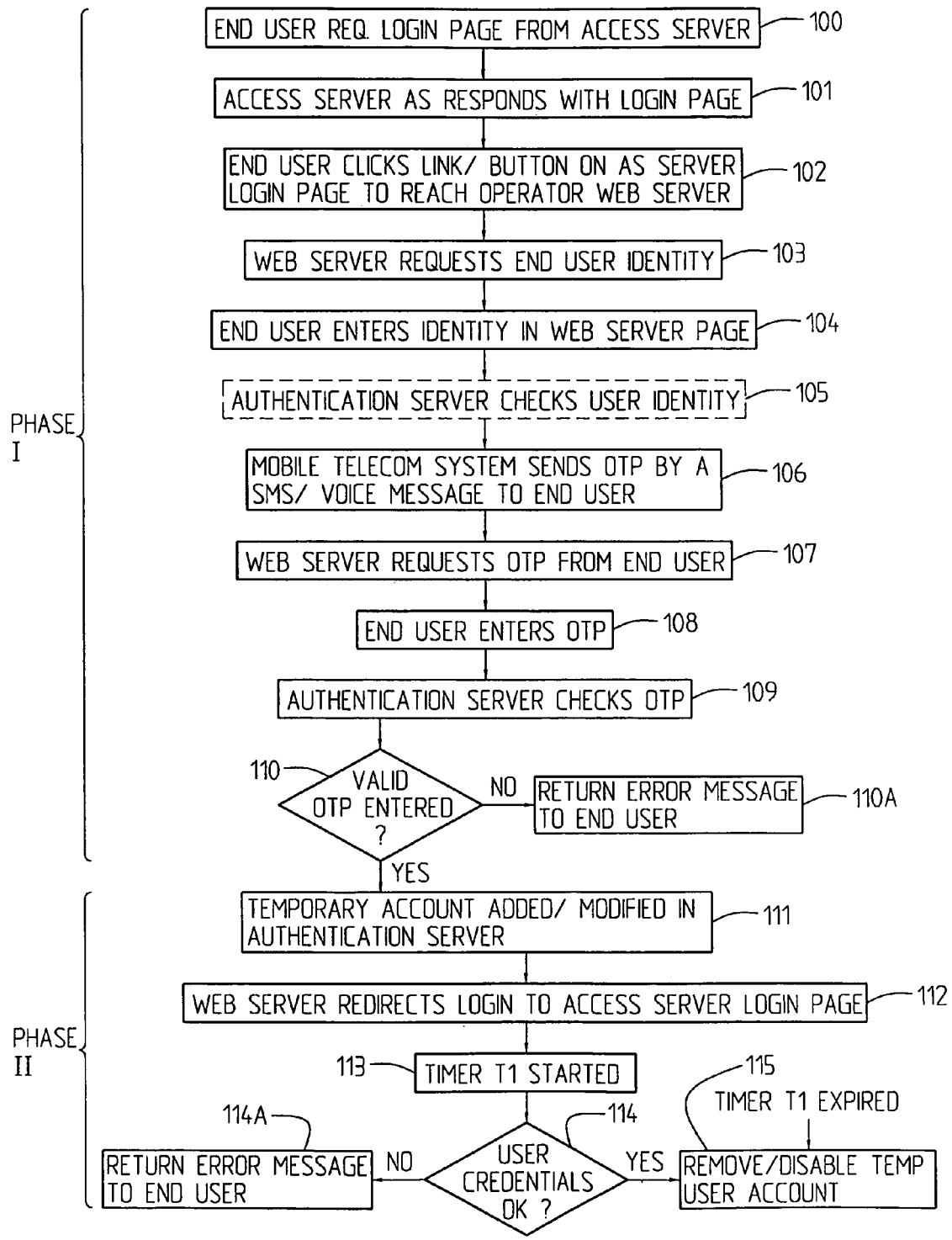
FIG. 2 is a schematical flow diagram describing an aspect of the inventive concept.

In the flow diagram of FIG. 2 a general implementation of an invention concept is illustrated. Thus it is supposed that communication is established between the end user station (i.e. the first means of the end user station, e.g. a PC) and the access server by the user requesting a login page, 100. The access server responds to the request by furnishing the end user with a login page, 101. The user then clicks an operator link/button on the access server login page to reach the web server, 102. The web server then requests a user identity from the end user, 103. The end user identity is then entered by the user in the web server page, 104. Subsequently an authentication server may check the user identity. This, however, is an optional step, the box of step 105 is therefore indicated within dashed lines in the figure. Unless a valid user identity was given, the procedure is interrupted, and the user receives an error message.

The authentication server is in an advantageous implementation a Radius server. In another embodiment it comprises a Diameter server. It may however be any authentication server.

The authentication server subsequently via a mobile telephony system sends an OTP e.g. by SMS or as a voice message to the end user, 106. (Also here the procedure is interrupted, e.g. an error message sent to the receiver unless a valid user identity was given within a predetermined time period.) Subsequently the web server requests the OTP from the end user, 107, who enters the OTP received by e.g. SMS, 108. Thereupon the authentication server checks the OTP, 109. If a valid OTP was entered, 110, it is proceeded with the second phase of the login procedure as will be described below. (Thus, the first phase of the login procedure comprises steps 100-110.) If no valid OTP was entered, an error message is returned to the user, 110A, and the procedure is interrupted.

In the second phase of the login procedure (supposing a valid OTP was entered by the user), a temporary account is added/modified by the authentication server, 111. User credentials (e.g. user name and password) are given for the temporary account. The web server then redirects the login request message to the access server login page, 112. Then also a timer T1 is started, 113. An authentication request is then sent from the access server to the authentication server, which checks the user credentials, 114, to verify if they are valid. If not, an error message is returned to the end user, 114A. If yes, e.g. at expiry of the timer T1 (or earlier), the temporary user account is removed or disabled, 115.

Figure 3:
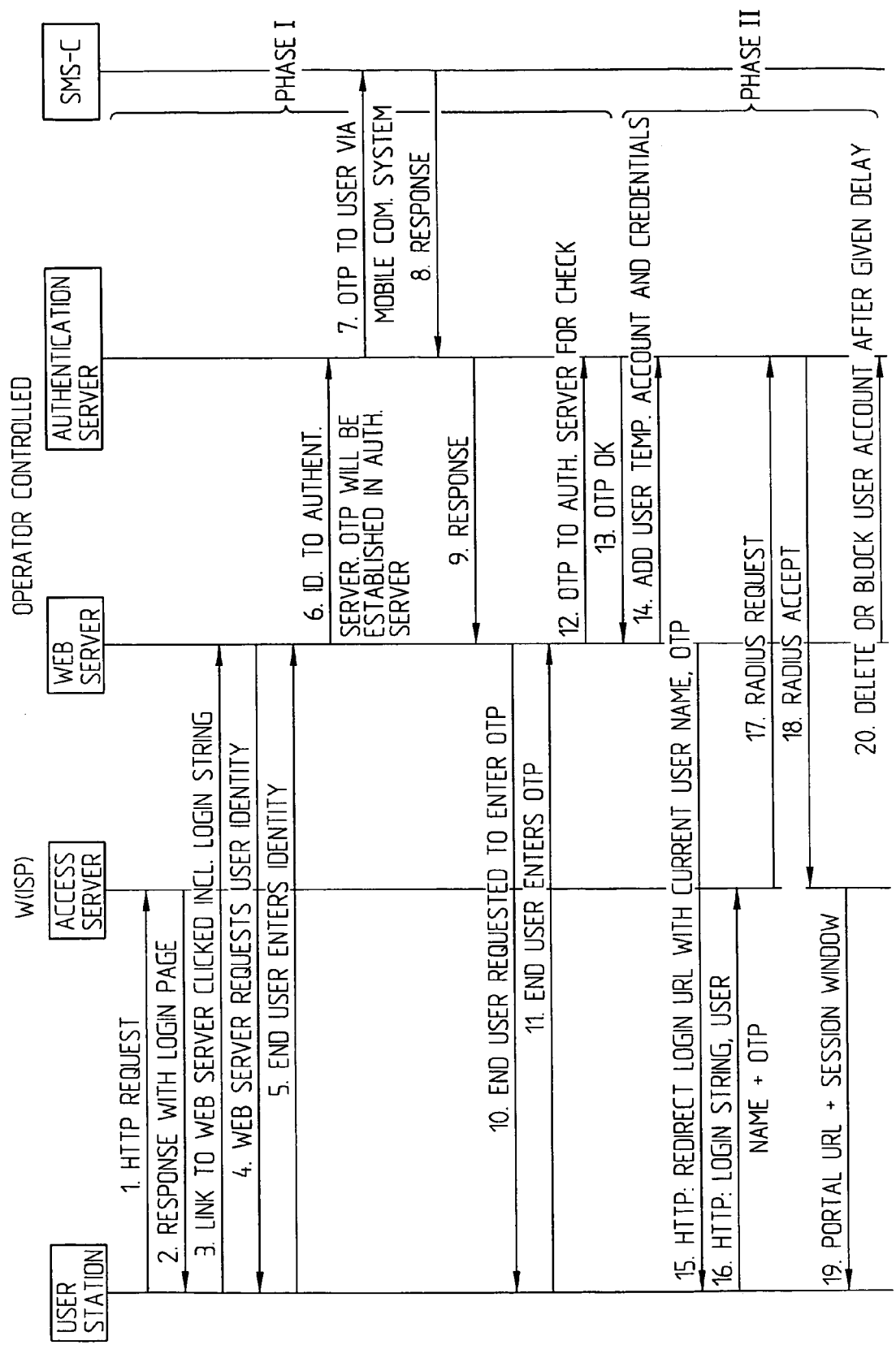
FIG. 3 is a signalling diagram describing one implementation of the invention concept.

One implementation will now somewhat more thoroughly be described with reference to the signalling diagram of FIG. 3. First a HTTP request is sent from the user station (first means) to the access server, 1. The request goes to the login page of the access server. The access server returns a response with the login page to the user, 2. The login page contains a button or similar, the activation of which results in a link to the login server of the operator. The user is subsequently supposed to click the link and then reaches the web server of the operator, since the access to this web server is open in the access server by configuration, 3. Particularly the syntax of the login message to be used in the second phase of the login procedure may be transferred in this message. Then the web server request the user identity, 4, and in response thereto the user enters his identity, e.g. MSISDN 5. This is forwarded to the authentication server, 6, which provides an OTP and forwards it to SMS-C of a mobile communications system, which transfers the OTP to the user e.g. by an SMS, 7. Information thereon is provided to the authentication server and the web server, 8, and the user is requested to enter the OTP by the authentication server, 9, over the web server, 10. The user then enters the OTP given by e.g. SMS or a voice message on the first means of the user station (e.g. a PC), and the OTP is via the web server provided to the authentication server, 11, 12. The authentication server then verifies the OTP to see if it is valid. If yes, a message with information to that fact is sent to the web server, 13. (In one implementation a dynamic account could be created before a correct OTP has been returned, e.g. for reasons of performance.) At this stage of the login procedure the first phase is terminated and it is proceeded with the second login phase.

Then, in this implementation, a temporary user account is created or modified to an account with a user id and with OTP as password, 14. A redirect message is then sent to the user station with the login URL, e.g. http://<access server IP address>/login ? user name=<username>& <password=OTP where anything between < > is replaced with current values, 15. The login message is then sent to the access server run by the (W)ISP, 16. An authentication request is subsequently sent to the authentication server, possibly relayed by one or more proxy servers, 17. In this particular embodiment the authentication server comprises a Radius server, as referred to earlier in the application. The Radius server (in this case) responds with an access accept message to the access server and the access server opens the communication, after verifying that the user credentials are correct, 18. The user receives the response when/if the authentication is successful, 19. It may contain a forced web portal and a session window branded by the operator.

Finally the credentials stored for the second login phase are removed or blocked after a delay corresponding to a given time period to prevent multiple logins, unless immediately followed by the OTP login sequence, 20. In one implementation a timer is used for this purpose. Other ways are also possible.

The second phase of the login procedure can be performed in different manners. The credentials (e.g. user name and password) of the temporary account can be defined in different manners according to different embodiments. They may have static or dynamic values. The combination of user name and password must be uniquely tied to the earlier OTP sequence (of the first login phase). In one implementation the same user name as for the first phase (OTP part) is used, and the OTP is used as password. In another implementation a dynamic user name is used and the OTP is used as password.

Still further a dynamic user name may be used, whereas a random value is used as password. According to still another embodiment a static user name that is common for all users is used. Then may e.g. the OTP be used as password, or alternatively a random value may be used as password. A number of other alternatives are also possible. Also in other aspects the invention is not limited to the specifically illustrated embodiments, but it can be varied in a number of ways within the scope of the appended claims.

The invention claimed is:

1. An arrangement for providing an end user at a user station with access to an IP network, the arrangement comprising:
   an access server of an access network;
   a web server;
   an authentication server; and
   the user station comprising
      first means for communication with the access server and the web server, and
      second means for communication with the authentication server over a mobile telecommunications system,
   wherein the authentication server is connected to the web server,
   wherein the arrangement performs an access/login procedure comprising a first phase and a second phase,
   wherein the authentication server controls the first phase,
   wherein, in the first phase, the arrangement is structured to:
      at a reception of a login request from the user station, the access server provides a response to the user station enabling activation of a link to the web server and storing login syntax,
      upon reception of the response from the access server, the user station provides a login message, the link or a button being clicked, including the login syntax of the login message, to the web server,
      upon reception of the login message from the user station, the webserver requests entry of an end user identity, and upon reception of the end user identity, provides the end user identity to the authentication server,
      upon reception of the end user identity from the webserver, the authentication server creates a one-time password (OTP) and transfers the OTP to the second means of the user station over the mobile communications system,
      the web server requests the end user to enter the OTP, and the authentication server verifies a validity of the OTP entered by the end user, and
   wherein, in the second phase which follows the first phase upon verifying that the OTP entered by the end user is valid, the arrangement is structured to:
      the authentication server creates temporary user account for which user credentials are defined in order to log in the end user at the access server, and
      the web server transfers a redirect login message to the user station including the login syntax of the login message to redirect the login to the access server login page, removes/disables the temporary account after a given delay, sets a timer to a given time period during which the user credentials are checked, and if they are not valid, returns an error message to the end user.

2. The arrangement according to claim 1, wherein the access server (AS) is operated by an Internet Service Provider.

3. The arrangement according to claim 2, wherein the Internet Service Provider offers a wireless service.

4. The arrangement according to claim 1, wherein the OTP used in the first phase is reused in the second phase.

5. The arrangement according to claim 1, wherein the first means of the user station comprises a PC, and the second means comprises a mobile telephone.

6. The arrangement according to claim 1, wherein the OTP is transferred by an alpha-numeric text message or a voice message to the second means of the user station.

7. The arrangement according to claim 5, wherein the OTP is entered on the first means of the user station and provided to the authentication server for authentication/validation.

8. The arrangement according to claim 7, wherein, if the OTP is valid, the OTP from the first phase is reused in the second phase.

9. The arrangement at least according to claim 1, wherein, if the OTP is valid, a user name and a password of the created account are defined, which are uniquely tied to the OTP.

10. The arrangement according to claim 9, wherein in the second phase a same user name is used as in the first phase and the OTP is used as the password.

11. The arrangement according to claim 9, wherein for the second phase a dynamic user name is used and the OTP is used as the password.

12. The arrangement according to claim 9, wherein for the second phase a static user name is used and the OTP is used as the password.

13. The arrangement according to claim 9, wherein for the second phase a static user name is used and a random number is used as the password.

14. The arrangement according to claim 9, wherein for the second phase a dynamic user name is used and a random value is used as the password.

15. The arrangement according to claim 1, wherein, if the user credentials comprise user name and password, and if they are verified/authenticated within the given time period, the created temporary user account is removed/disabled.

16. The arrangement according to claim 1, wherein the authentication server comprises a Radius server or a Diameter server.

17. The arrangement according to claim 16, wherein one or more proxy servers are provided between the access server (AS) and the authentication server.

18. The arrangement according to claim 17, wherein the access network comprises a wireless local area network or an Ethernet.

19. An access server in an access network communicating with an end user station for providing said end user station with access to an IP network, with a web server and with an authentication server, the access server comprising:
   an access mechanism to allow a user at the end user station to perform an access attempt to the web server, by providing a white list function, a login link to the operator, and by supporting authentication server roaming; and
   a second phase support mechanism that supports a second phase of a login procedure following a first phase during which a one-time-password is given by the authentication server to the end user station over a mobile communication system as an SMS or a voice message,
   wherein the access mechanism performs in the first phase upon reception of a login request message from the end user station, providing a response to the end user station enabling activation of a link to the web server, and storing login syntax of the login request message, upon activation of the link to the web server from the end user station, establishing a connection between the end user station and the web server with the access server serving as an intermediary for the connection, upon establishing the connection between end user station and the web, receiving an end user identity from the end user station and forwarding the end user identity to the web server, and upon forwarding the end user identity to the web server, receiving a one-time-password (OTP) entered at the end user station and forwarding the entered OTP to the web server, wherein the second phase support mechanism performs in the second phase upon forwarding the entered OTP to the webserver, receiving a redirected login message from the web server and providing the login message to the end user station, the login message being for a verified OTP with user credentials for a temporary account created in the authentication server and the login syntax, upon providing the login message to the end user station, receiving user credentials from the end user station, transferring an authentication request to the authentication server for verification of the user credentials and, upon transferring the authentication request and upon receiving an authentication accept message of the end user entered OTP, sending a response to the end user station and establishing a connection between the authentication server, and upon transferring the authentication request and upon an expiration of a timer that is set to a given time period during which the user credentials are checked, returning an error message to the end user station when the user credentials are not valid.

20. The access server according to claim 19, wherein the access server is of a wireless local area network or an Ethernet operated by an Internet Service Provider or a wireless ISP.

21. A method for providing an end user at an end user station with access to an IP network over an access network comprising an access server, the method comprising performing a login procedure comprising a first phase and a second phase:

wherein the first phase of the login procedure comprises:
sending a login request to an access server from the end user station;
providing a response from the access server to the end user station enabling activation of a link to an operator controlled web server;
the user station accessing the web server with a login message including login syntax;
storing the login syntax in the access server;
entering of an end user identity in the web server upon request;
provisioning the end user identity from the web server to the authentication server;
creating a one-time password (OTP) in the authentication server;
transferring the OTP to the end user station from the authentication server over a mobile communication system, by SMS or as a voice message;
the web server requesting the OTP from the end user through the end user station; and the authentication server verifying validity/authenticity of the OTP as entered by the end user, and wherein when the entered OTP is verified to be valid, the second phase follows the first phase, the second phase comprises:
creating a temporary account in the authentication server and defining user credential uniquely tied to the OTP used in the first phase;
the web server redirecting the login request comprising the login syntax to a login page of the access server;
the web server setting a timer;
sending an authentication request from the access server to the authentication server;
the authentication server checking the validity/authenticity of user credentials; and
when the user credentials are checked to be valid, the authentication server sending an accept message to the access server, the removing/ disabling the temporary account at expiry of the set timer.

22. The method according to claim 21, wherein in the second phase, a same user name used in the first phase is used as the user name and the OTP is used as the password.

23. The method according to claim 21, wherein in the second phase a dynamic user name is used, and the OTP of the first phase is used as the password.

24. The method according to claim 21, wherein in the second phase, a static user name common for all users is used and the OTP of the first phase or a random number is used as the password.

25. The method according to claim 21, wherein in the second phase, a dynamic user name is used and a random value is used as the password.

26. The method according to claim 21, wherein the access network comprises a wireless local area network or an Ethernet, and the authentication server comprises a Radius server or a Diameter server.

27. A method to grant an access to a web server to an end user at a first user terminal, the method comprising:
the web server receiving an end user identity from the first user terminal via an access server and forwarding the end user identity to an authentication server;
the authentication server receiving the end user identity forwarded from the web server and verifying a validity of the end user identity;
when the end user identity is verified to be valid, the authentication server generating a one-time-password (OTP) and sending the generated OTP to a second user terminal of the end user via a wireless mobile network separate from a network of the access server;
upon the authentication server sending the generated OTP to the second user terminal, the web server receiving, via the access server, an OTP entered at the first user terminal and forwarding the entered OTP to the authentication server;
the authentication server receiving the entered OTP forwarded from the web server verifying a validity of the entered OTP based on the generated OTP, and creating a temporary user account when the entered OTP is verified to be valid;
upon the authentication server verifying the validity of the entered OTP, the access server receiving a user credential entered at the first user terminal and forwarding the entered user credential to the authentication server;
the authentication server receiving the entered user credential forwarded the access server, verifying a validity of the entered user credential based on the temporary user account, and sending an access message to the server when the entered credential is verified to be valid, the authentication server sending an access accept message to the access server; and the access server, upon receiving the access accept message from the authentication server, granting the first user terminal access to the web server.

28. The method according claim 27, wherein the step of receiving the end user identity from the first user terminal comprises:
the access server receiving a login request from the first user terminal;
the access server providing a login page to the first user terminal in response to the login request, the login page including a link to connect the first user terminal to the web server (web server link);
the access server establishing a connection between the first user terminal and the web server upon activation of the web server link, the access server acting as an intermediary for the connection;
the web server requesting the first user terminal for the end user identity via the access server; and
the web server receiving the end user identity from the first user terminal via the access server.

29. The method according to claim 27, wherein the step of sending the generated OTP to the second user terminal comprises the authentication server sending the generated OTP as an alpha-numeric text message or a voice mail message.

30. The method according to claim 27,
wherein the step of creating the temporary user account comprises the authentication server creating a user credential based on the generated OTP (OTP based credential), and
wherein the step verifying the validity of the entered credential comprises the authentication server verifying that the entered credential received from the access server match the OTP based credential associated with the temporary account.

31. The method according to claim 30, wherein the OTP based credential includes a combination of a user id and a password in which the generated OTP is the password.

32. The method according claim 27, wherein the steps of receiving the entered credential from the first user terminal and forwarding the entered credential comprise:
upon the authentication server creating the temporary user account, the web server generating a login message based on a login syntax appropriate for a login page of the access server (AS login page) provided to the first user terminal by the access server, the login message including a request for entry of the entered credential;
the web server redirecting the login message to the AS login page;
the access server receiving the entered credential from the first user terminal; and
the access server making an authentication request to the authentication server based on the entered credential received from the first user terminal.

33. The method according to claim 32,
wherein the step of making the authentication request comprises the access server sending a RADIUS request message based on the entered credential to the authentication client, and
wherein the step of sending the access accept message comprises the authentication server sending a RADIUS accept message to the access server.

34. The method according to claim 27, wherein the first user terminal is a wireless or wired local area network capable device, the second user terminal is a mobile telephone, and the wireless mobile network is a mobile telephony system.

35. The method according to claim 34, wherein the first user terminal is a Wi-Fi and/or Ethernet capable device.

36. The method according to claim 27, wherein the access server is part of an access network of an Internet Service Provider (ISP) or a wireless ISP.

37. A method to grant an access to a web server for an end user at a first user terminal, the method comprising:
an authentication server receiving an end user identity from the web server and verifying a validity of the end user identity;
when the end user identity is verified to be valid, the authentication server generating a one-time-password (OTP) and sending the generated OTP to a second user terminal of the end user via a wireless mobile network;
upon the authentication server sending OTP to the second user terminal, the authentication server receiving an OTP entered at the first user terminal from the web server, verifying a validity of the entered OTP based on the generated OTP, and creating a temporary user account when the entered OTP is verified to be valid;
upon the authentication server creating the temporary user account, the authentication server receiving a user credential entered at the first user terminal from an access server, verifying a validity of the entered credential based on the temporary user account, and sending an access accept message to the access server when the entered credential is verified to be valid, the access accept message indicating that access to the web server to the first user terminal can be granted.

38. The method according to claim 37, wherein the step of sending the generated OTP to the second user terminal comprises the authentication server sending the generated OTP as an alpha-numeric text message or a voice mail message.

39. The method according to claim 37,
wherein the step of creating the temporary user account comprises the authentication server creating a user credential based on the generated OTP (OTP based credential), and
wherein the step verifying the validity of the entered credential comprises the authentication server verifying that the entered credential received from the access server match the OTP based credential.

40. The method according to claim 39, wherein the OTP based credential includes a combination of a user id and a password in which the generated OTP is the password.

41. The method according to claim 37,
wherein the step of receiving the entered credential comprises the authentication server receiving a RADIUS request message based on the entered credential from the access server, and
wherein the step of sending the access accept message comprises the authentication server sending a RADIUS accept message to the access server.

42. The method according to claim 37, wherein the first user terminal is a wireless or wired local area network capable device, the second user terminal is a mobile telephone, and the wireless mobile network is a mobile telephony system.

43. A method to grant an access to a web server for an end user at a user terminal, the method comprising:
the web server receiving an end user identity from the user terminal via an access server and forwarding the end user identity to an authentication server;
upon forwarding the end user identity to the authentication server and subsequent to a generation of a one-time-password (OTP) by the authentication server, the web server receiving the OTP entered at the user terminal (OTP) via the access server and forwarding the entered OTP to the authentication server;

upon forwarding the entered OTP to the authentication server and subsequent to a creation of a temporary user account for the end user by the authentication server, the web server generating a login message based on a login syntax appropriate for a login page of the access server provided to the user terminal by the access server, the login message including a request for entry of the credential of the end user; and the web server redirecting the generated login message to the login page of the access server enabling the access server to receive the entered user credential from the user terminal.

44. A method to grant an access to a web server to an end user at a user terminal, the method comprising:

an access server receiving a login request from the user terminal;

in response to the login request, the access server providing a login page to the user terminal, the login page including a link to connect the user terminal to the web server;

upon providing the login page to the user terminal and in response to the link being activated, the access server establishing a connection between the user terminal and the web server, the access server acting as an intermediary for the connection;

upon establishing the connection between the user terminal and the web server, the access server receiving an end user identity from the user terminal and forwarding the end user identity to the web server;

upon forwarding the end user identity to the web server, the access server receiving a one-time-password (OTP) entered at the first user terminal and forwarding the entered OTP to the web server;

upon forwarding the entered OTP to the web server, the access server receiving a login message from the web server and providing the login message to the user terminal, the login message being based on a login syntax appropriate for the login page provided to the user terminal, the login message including a request for entry of a credential of the end user;

upon providing the login message to the user terminal, the access server receiving the credential entered at the user terminal and forwarding the entered user credential to the authentication server; and upon forwarding the entered user credential to the authentication server, the access server receiving an access accept message from the authentication server indicating that end user access is allowable, and granting the user terminal access to the web server upon receiving the access accept message.

45. The method according to claim 44, wherein the step of forwarding the entered credential comprises the access server sending a RADIUS request message based on the entered credential to the authentication server, and wherein the step of receiving the access accept message comprises the access server receiving a RADIUS accept message from the authentication server.

46. The arrangement according to claim 1, wherein in the first phase, the web server requests user identity to the end user at the user station upon a link being established between the user station and the web server through the access server.

47. A method to grant an IP access to a web server to an end user at a user terminal, the method comprising:

the user terminal sending a login request to an access server;

upon sending the login request to an access server, the user terminal receiving a login page from the access server, the login page including a web server link;

upon receiving the login page and upon the end user selecting the web server link, the user terminal connecting to a web server;

upon connecting to the web server, the user terminal receiving a request for an end user identity from the web server;

upon receiving the request for the end user identity from the web server, the user terminal sending the end user identity entered by the end user to the web server;

upon sending the end user identity entered by the end user to the web server, the user terminal sending a one-time-password (OTP) entered by the end user to the access server, the OTP being generated at an authentication server and sent to the end user via SMS through a mobile telephony system;

upon sending the OTP entered by the end user to the access server, the user terminal receiving a request for entry of a credential of the end user from the web server;

upon receiving the request for entry of the credential of the end user from the web server, the user terminal sending the credential of the end user entered by the end user to the access server to enable the access server to authenticate the end user with an authentication servers; and upon sending the credential of the end user entered by the end user to the access server, the user teirnin1 receiving a grant of access to the web server.

* * * * *

UNITED STATES PATENT AND TRADEMARK OFFICE
CERTIFICATE OF CORRECTION

| | | |
|---|---|---|
| PATENT NO. | : 8,108,903 B2 | Page 1 of 1 |
| APPLICATION NO. | : 11/298568 | |
| DATED | : January 31, 2012 | |
| INVENTOR(S) | : Norefors et al. | |

It is certified that error appears in the above-identified patent and that said Letters Patent is hereby corrected as shown below:

In Column 3, Line 44, delete "by" and insert -- by, --, therefor.

In Column 5, Line 5, delete "authenticationserver." and insert -- authentication server. --, therefor.

In Column 8, Line 23, in Claim 9, delete "at least".

In Column 10, Line 18, in Claim 21, delete "the removing/" and insert -- the access server allowing the user login request, and the authentication server removing/ --, therefor.

In Column 10, Line 56, in Claim 27, delete "server" and insert -- server, --, therefor.

In Column 10, Line 65, in Claim 27, delete "forwarded" and insert -- forwarded from --, therefor.

In Column 10, Line 67, in Claim 27, delete "access message to the server" and insert -- access accept message to the access server --, therefor.

In Column 11, Line 7, in Claim 28, delete "according" and insert -- according to --, therefor.

In Column 11, Line 42, in Claim 32, delete "according" and insert -- according to --, therefor.

In Column 12, Line 17, in Claim 37, delete "sending" and insert -- sending the generated --, therefor.

In Column 14, Line 45, in Claim 47, delete "servers;" and insert -- server; --, therefor.

In Column 14, Line 47, in Claim 47, delete "teirnin1" and insert -- terminal --, therefor.

Signed and Sealed this
Twenty-sixth Day of June, 2012

David J. Kappos
*Director of the United States Patent and Trademark Office*